Aug. 19, 1924.

G. BARKSTROM 1,505,691

CHAIN ASSEMBLING AND RIVETING MACHINE

Filed May 6, 1921     10 Sheets-Sheet 1

Inventor.
Gustaf Barkstrom
By H. P. Doolittle
Atty.

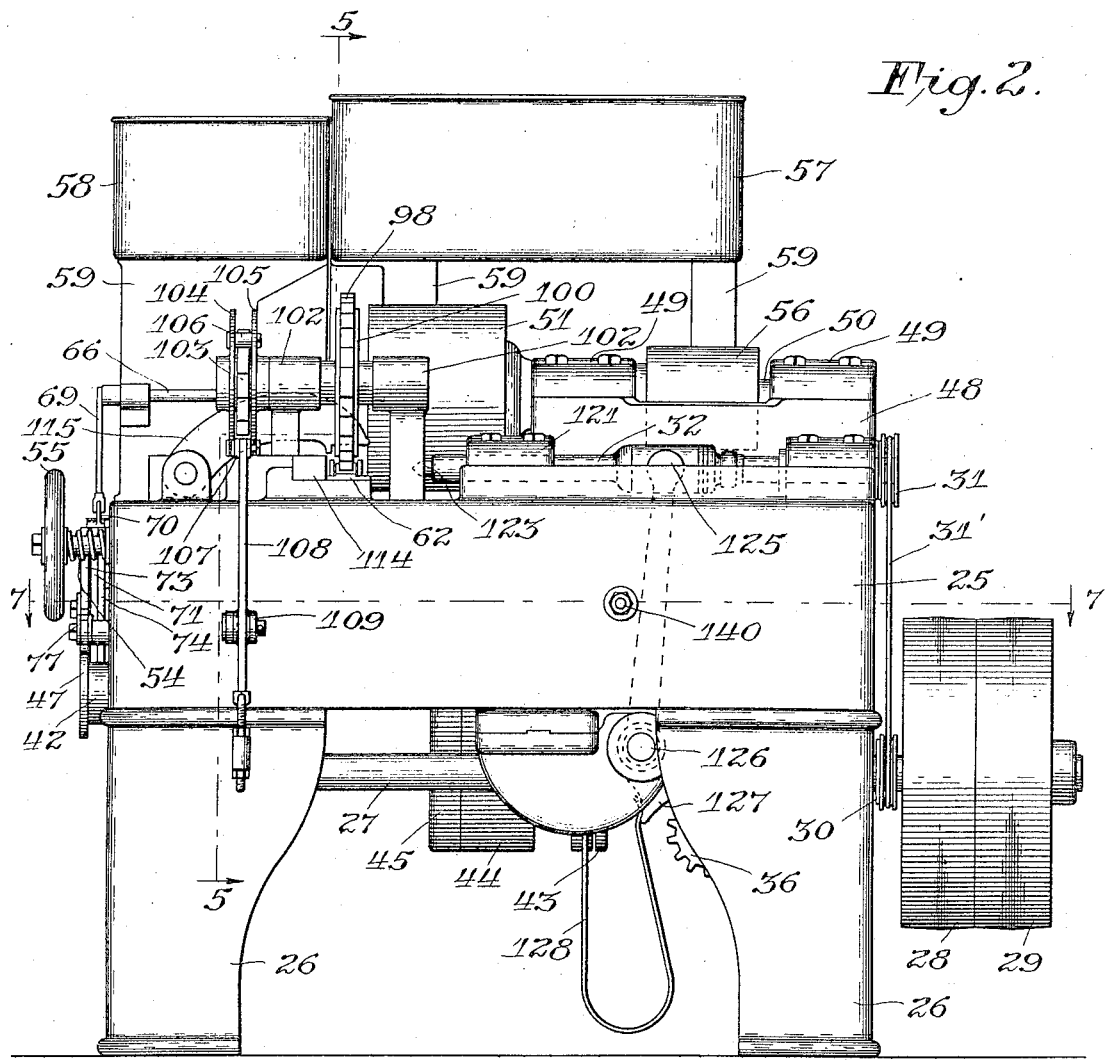

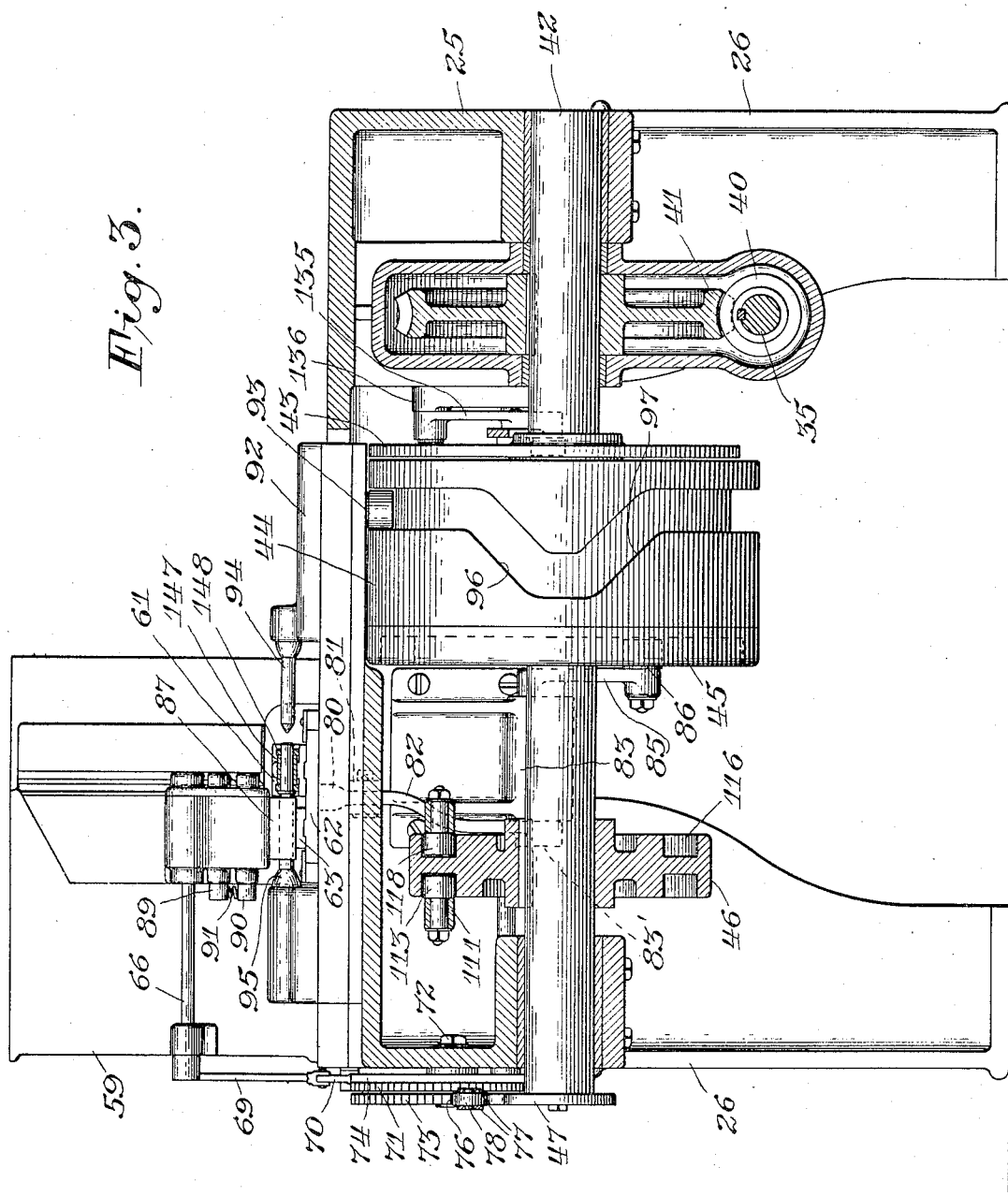

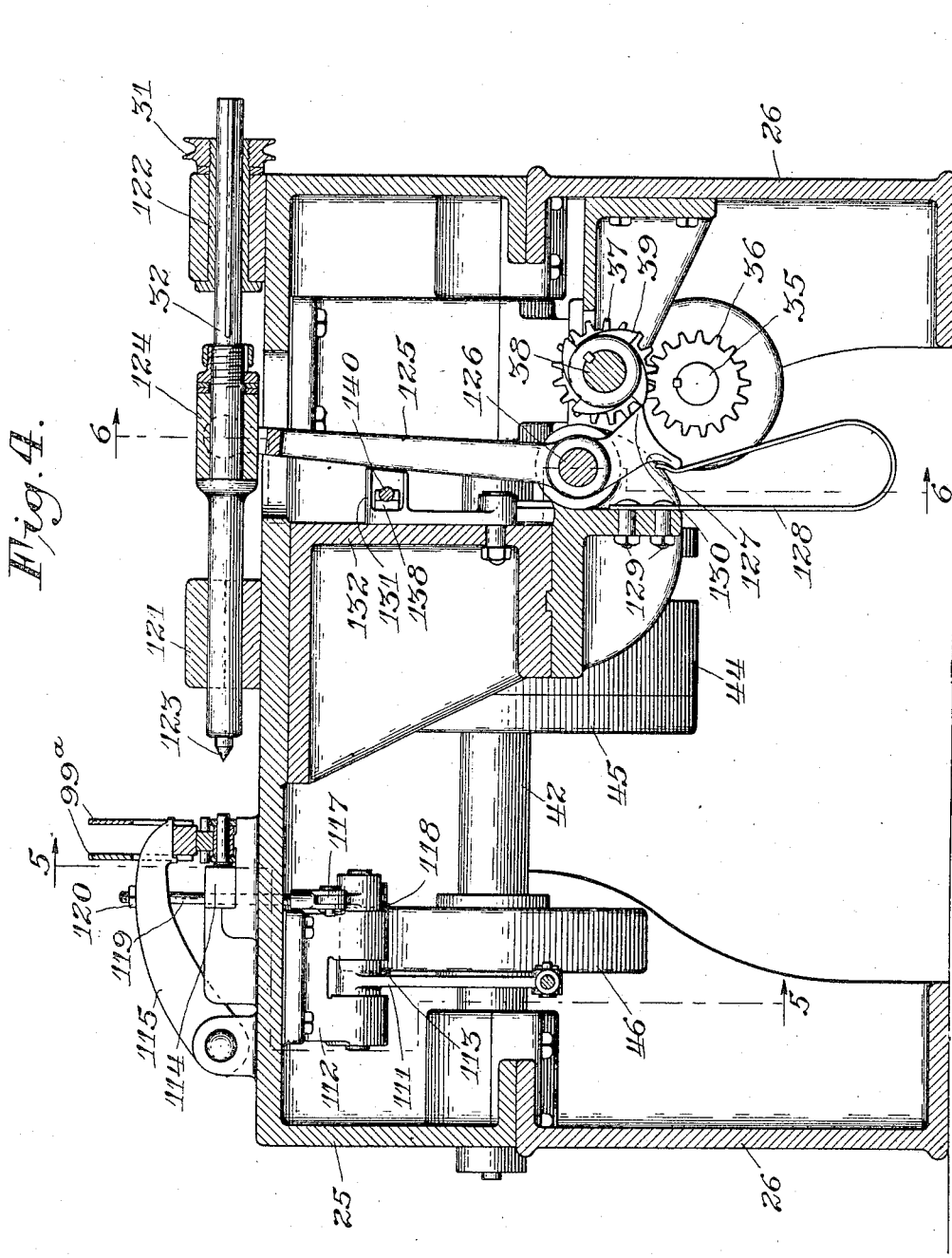

Aug. 19, 1924.
G. BARKSTROM
1,505,691
CHAIN ASSEMBLING AND RIVETING MACHINE
Filed May 6, 1921  10 Sheets-Sheet 5
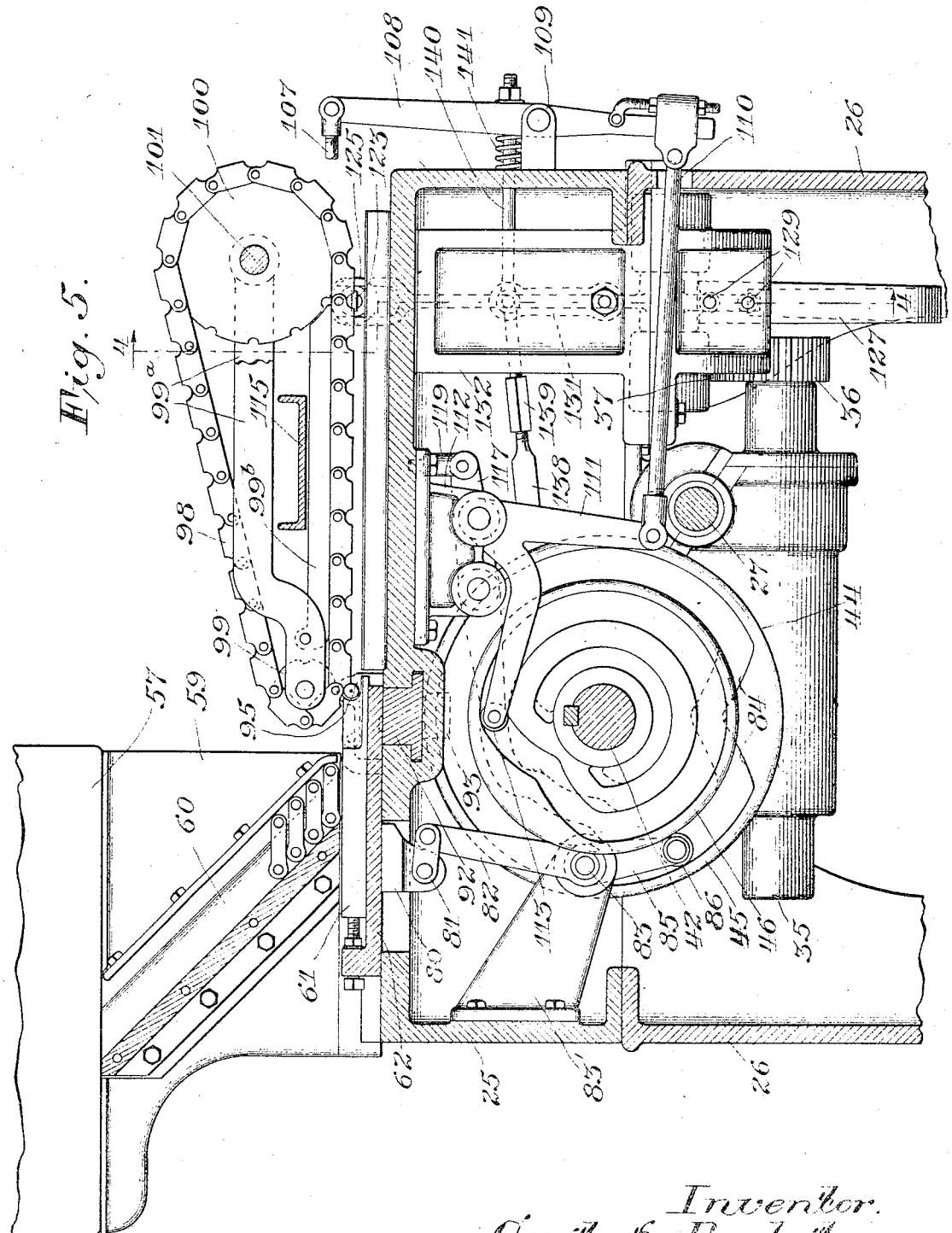
Inventor.
Gustaf Barkstrom,
By W.P. Deleitle
Atty

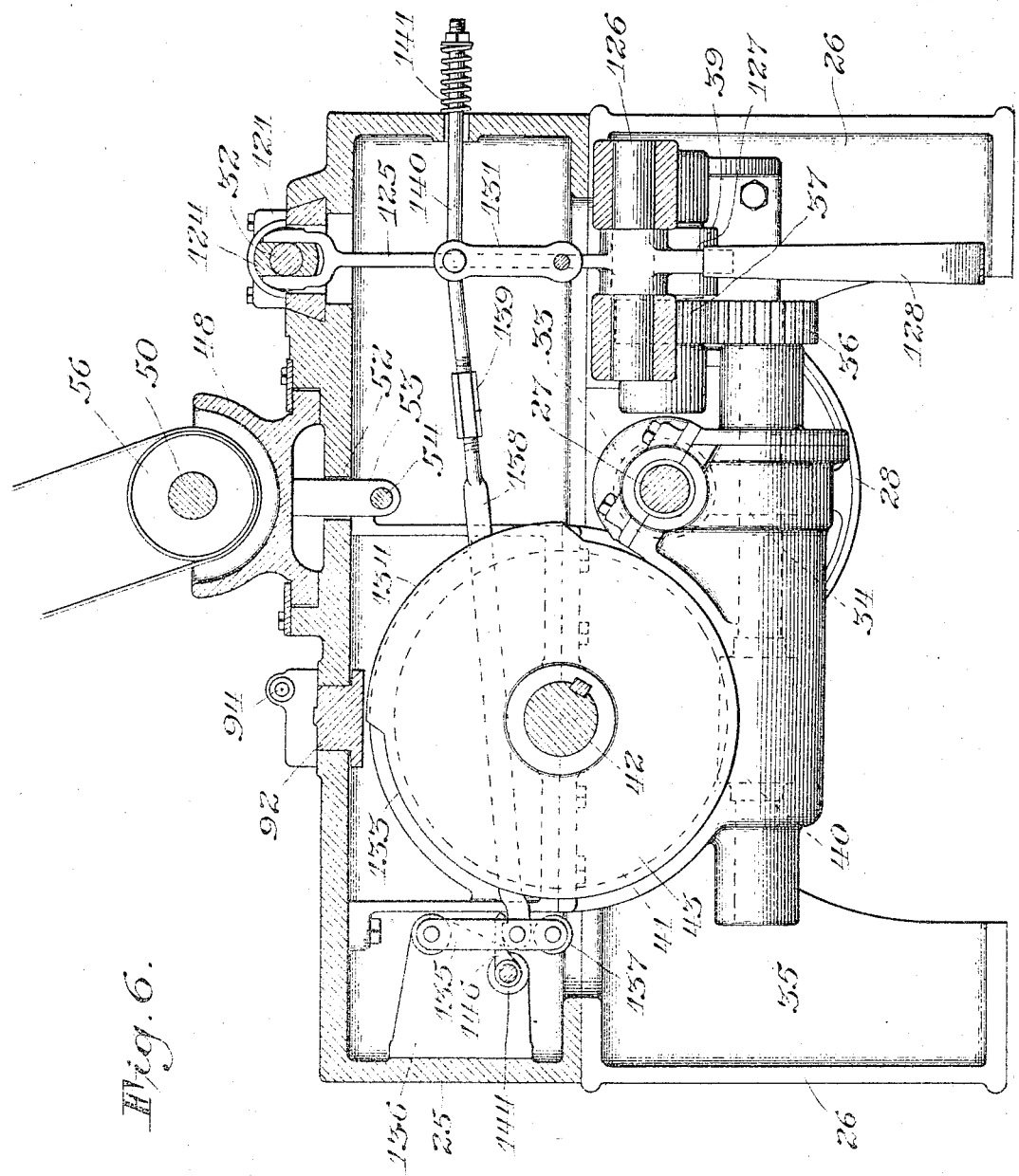

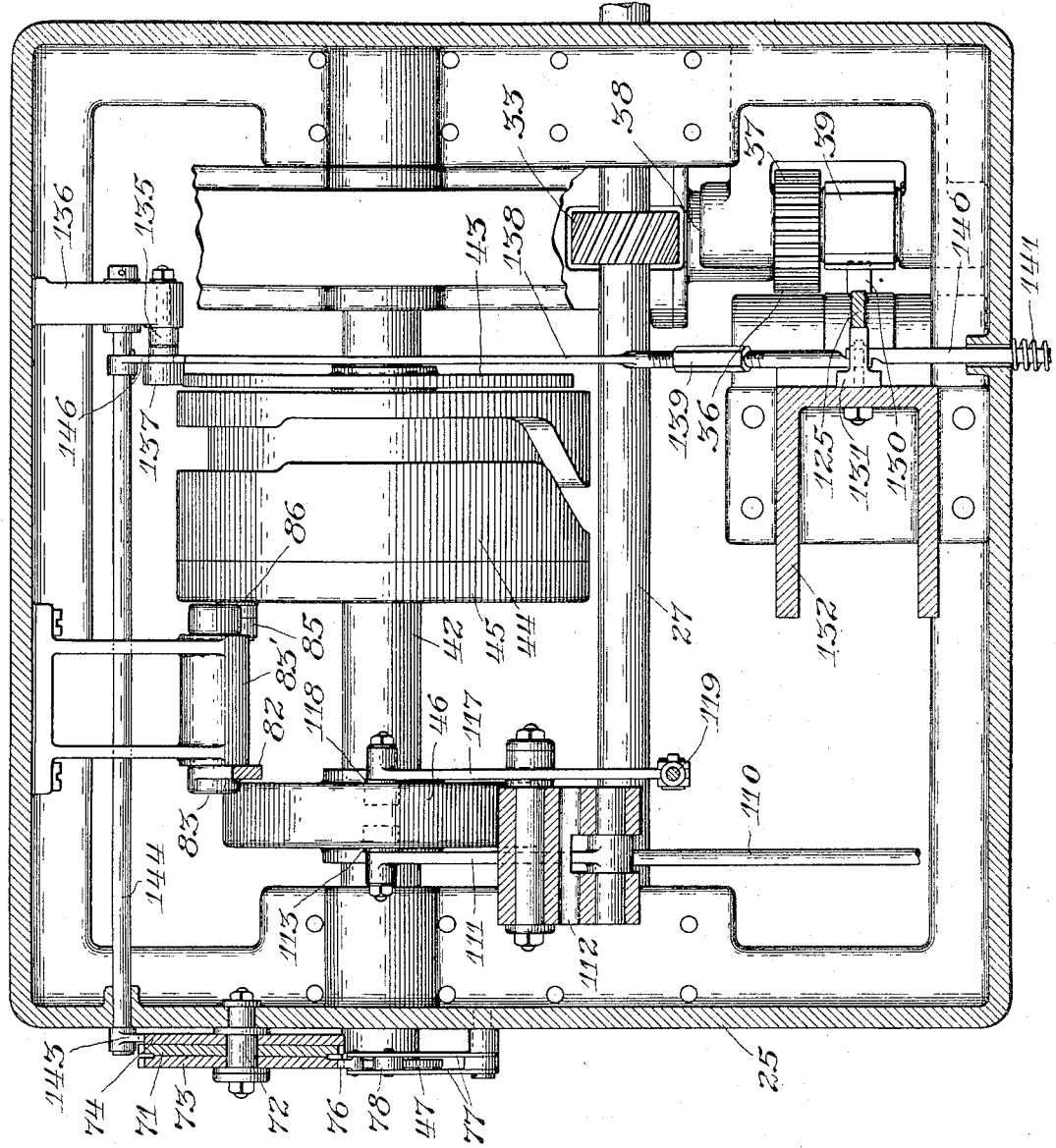

Aug. 19, 1924.  
G. BARKSTROM  
1,505,691  
CHAIN ASSEMBLING AND RIVETING MACHINE  
Filed May 6, 1921  10 Sheets-Sheet 8
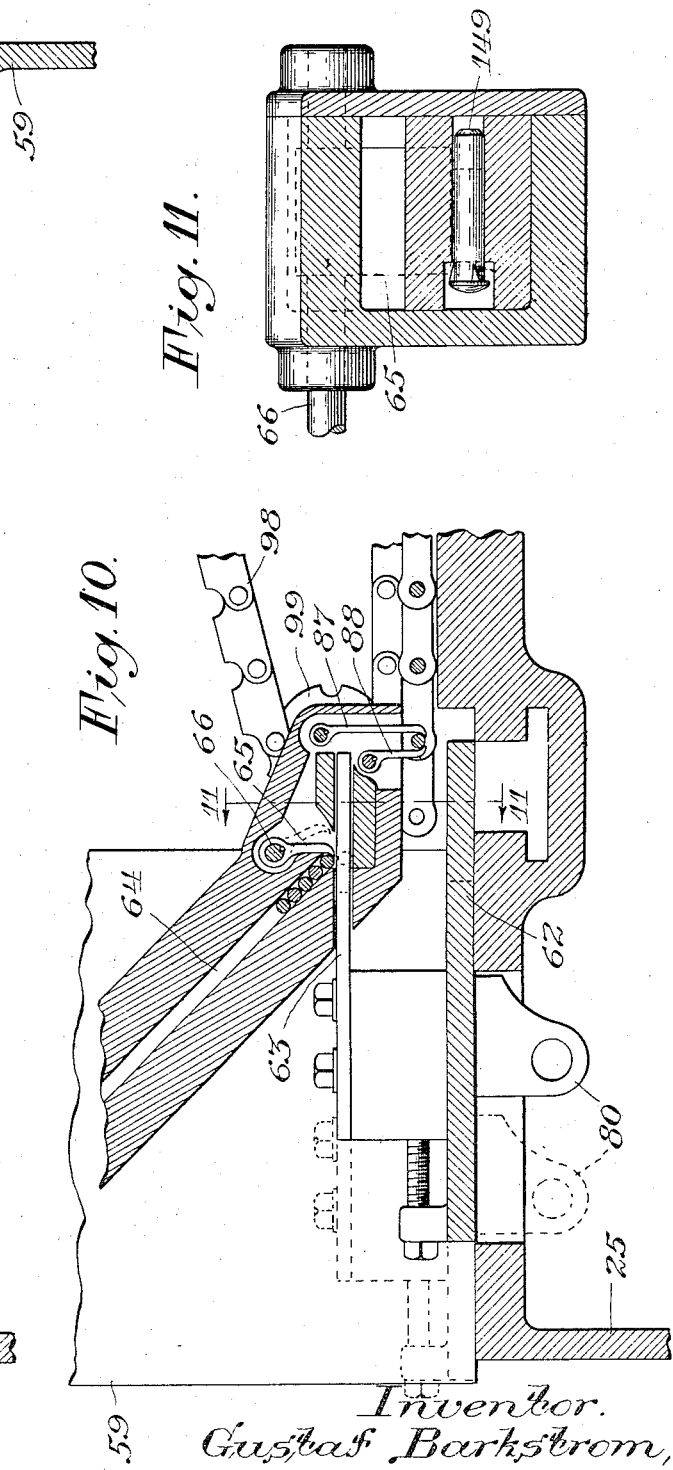
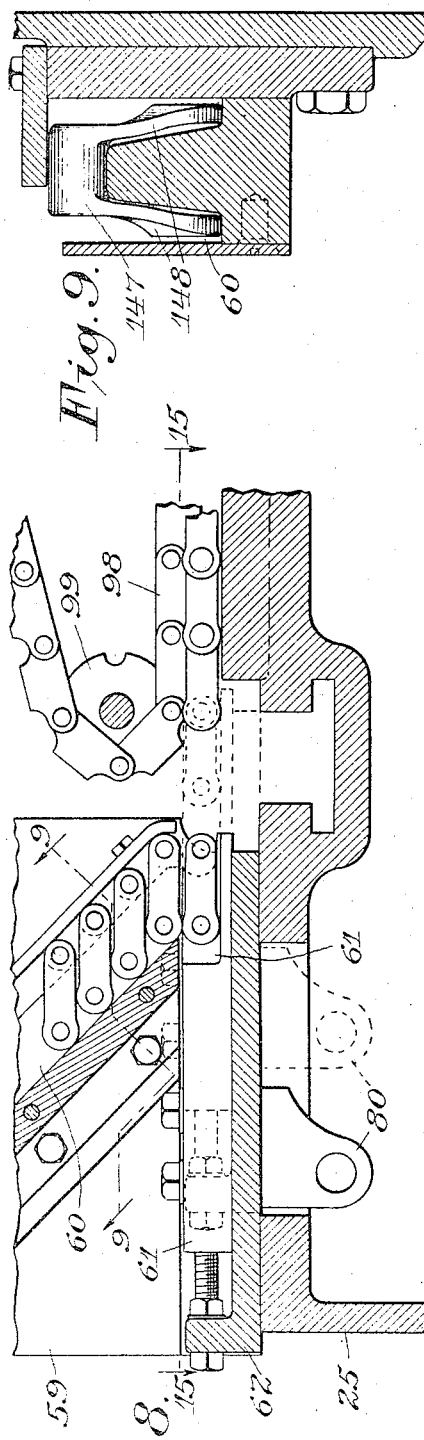
Inventor.  
Gustaf Barkstrom,  
By H.P. Doolittle  
Atty.

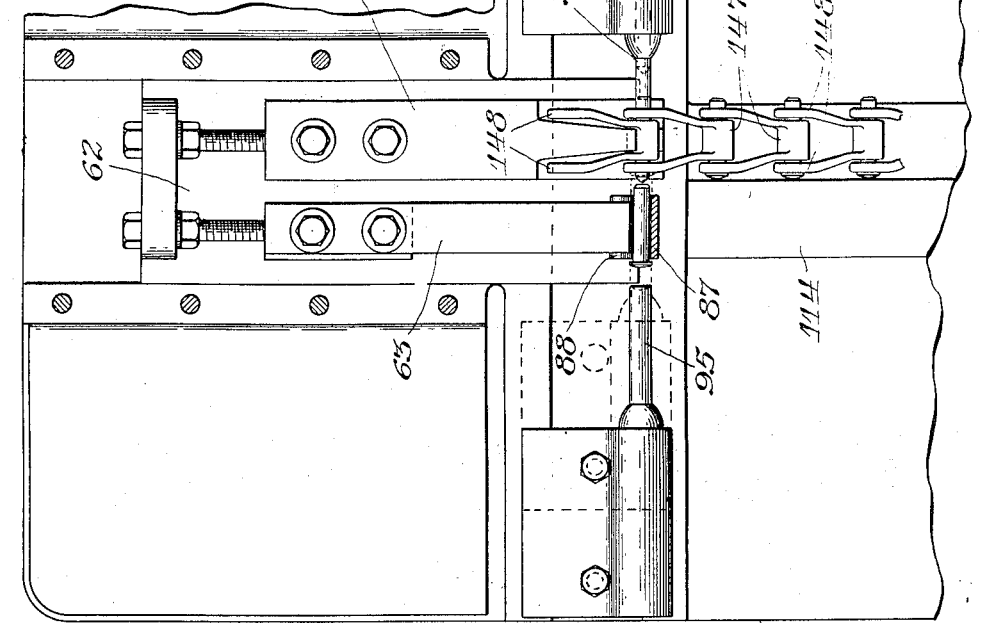

Aug. 19, 1924.
G. BARKSTROM
1,505,691
CHAIN ASSEMBLING AND RIVETING MACHINE
Filed May 6, 1921   10 Sheets-Sheet 10
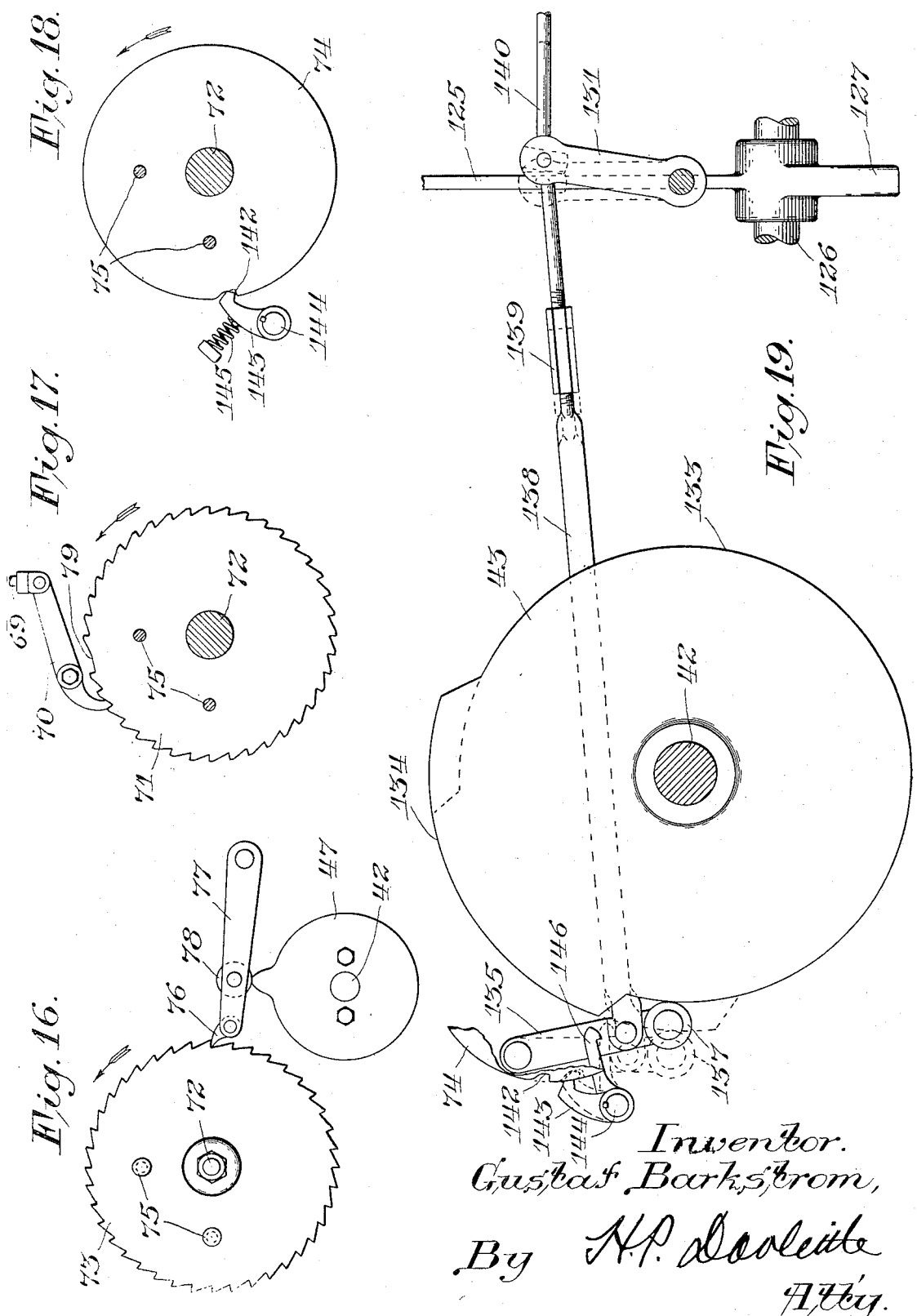
Inventor.
Gustaf Barkstrom,
By H. P. Doolittle
Atty.

Patented Aug. 19, 1924.

1,505,691

UNITED STATES PATENT OFFICE.

GUSTAF BARKSTROM, OF CICERO, ILLINOIS, ASSIGNOR TO INTERNATIONAL HARVESTER COMPANY, A CORPORATION OF NEW JERSEY.

CHAIN ASSEMBLING AND RIVETING MACHINE.

Application filed May 6, 1921. Serial No. 467,498.

*To all whom it may concern:*

Be it known that I, GUSTAF BARKSTROM, a citizen of the United States, residing at Cicero, in the county of Cook and State of Illinois, have invented certain new and useful Improvements in Chain Assembling and Riveting Machines, of which the following is a full, clear, and exact specification.

My invention relates to sprocket drive chains, and particularly to a means for and method of manufacturing such chains.

As is well known, sprocket chains are largely used for driving the operative mechanisms of many agricultural implements, and particularly harvesting machines. Since agricultural implements must be sold at a low price, inexpensive drive chains must be used, yet these chains must at the same time be strong and durable to withstand the hard usage to which they are subjected, as well as exposure to the elements. Heretofore two types of chains have been largely used, each formed from links of malleable iron castings. In the one case, each link has a pin formed integral therewith at one end and an integral hook at the other end, the hook on each link engaging the pin on the adjacent link to form the chain and providing a bearing for the pin, the length of the chain being determined by the number of links hooked together. This provides a very cheap chain and one that can easily be varied in length by inserting or taking out links, but soon wears out, since the malleable pins and hooks are relatively soft and consequently wear rapidly. The other type of chain is usually of much heavier construction and is formed from malleable links secured together by case-hardened pins or rivets, each link having a relative-long barrel or bearing at one end which rotatably engages the case-hardened pins so that wear of the parts is minimized. Chains of this latter type have heretofore been manufactured by hand processes which were necessarily slow and resulted in a high cost for the chain. In the manufacture of such chains, one end of the pins or rivets is ground to remove the case and expose the relatively soft metal forming the interior of the pin. The holes in two links are then aligned to permit insertion of the pin, the ground end being then headed by riveting to secure the links together. The great amount of labor connected with this mode of making chains makes the chains relatively expensive and therefore limits their use, even though they are relatively much superior in strength and wearing qualities to chains of the first described type.

It is therefore an object of my invention to provide a machine that will take the place of hand labor in the manufacture of sprocket chains of certain types.

It is another object to provide a machine that will automatically align the links and insert the pins which are fed to it and then secure the pins in the links to form a chain.

A still further object is to provide a machine to which links and pins are continuously supplied that will automatically assemble the links and pins to form a chain of predetermined length.

Yet another object is to devise a method of manufacturing a chain, the successive steps of which can be carried out by a mechanism that will assemble the links and pins to form a chain of any desired length.

With the above and other objects in view, reference will now be had to the accompanying drawings for a complete disclosure of my invention, in which:

Fig. 2 is a rear elevation of the machine, looking from the right toward the left in Fig. 1;

Fig. 3 is a vertical sectional view taken substantially on the line 3—3 of Fig. 1;

Fig. 4 is a vertical section on the line 4—4, Figures 1 and 5, certain parts beyond the plane of the section being omitted for the sake of clearness;

Fig. 5 is a sectional view on the broken line 5—5 of Figures 2 and 4;

Fig. 6 is a sectional view on the line 6—6 of Fig. 4, showing the means for locking the rivet spindle in inoperative position when a pin is omitted from the chain;

Fig. 7 is a horizontal sectional view on the line 7—7 of Fig. 2, certain parts being broken away or omitted for the sake of clearness;

Figures 8 and 9 are details of the link feeding mechanism. Fig. 9 being a section on line 9—9 of Figure 8;

Figures 10 and 11 show details of the pin feeding mechanism, Figure 11 being a section on line 11—11 of Figure 10, a pin being shown in the slot instead of the pin pusher;

Figures 12, 13 and 14 are further details of the link and pin feeding mechanism;

Fig. 15 is a sectional plan view taken substantially on the line 15—15 of Figure 8, showing the means for centering the links and inserting a pin;

Figures 16, 17 and 18 are detail views respectively of the ratchet and index cam, the rivet separator cam, and the rivet spindle index cam;

Figure 19 is a detail view of the rivet spindle or hammer cut-out cam and means for holding the hammer in inoperative position.

Figure 1:
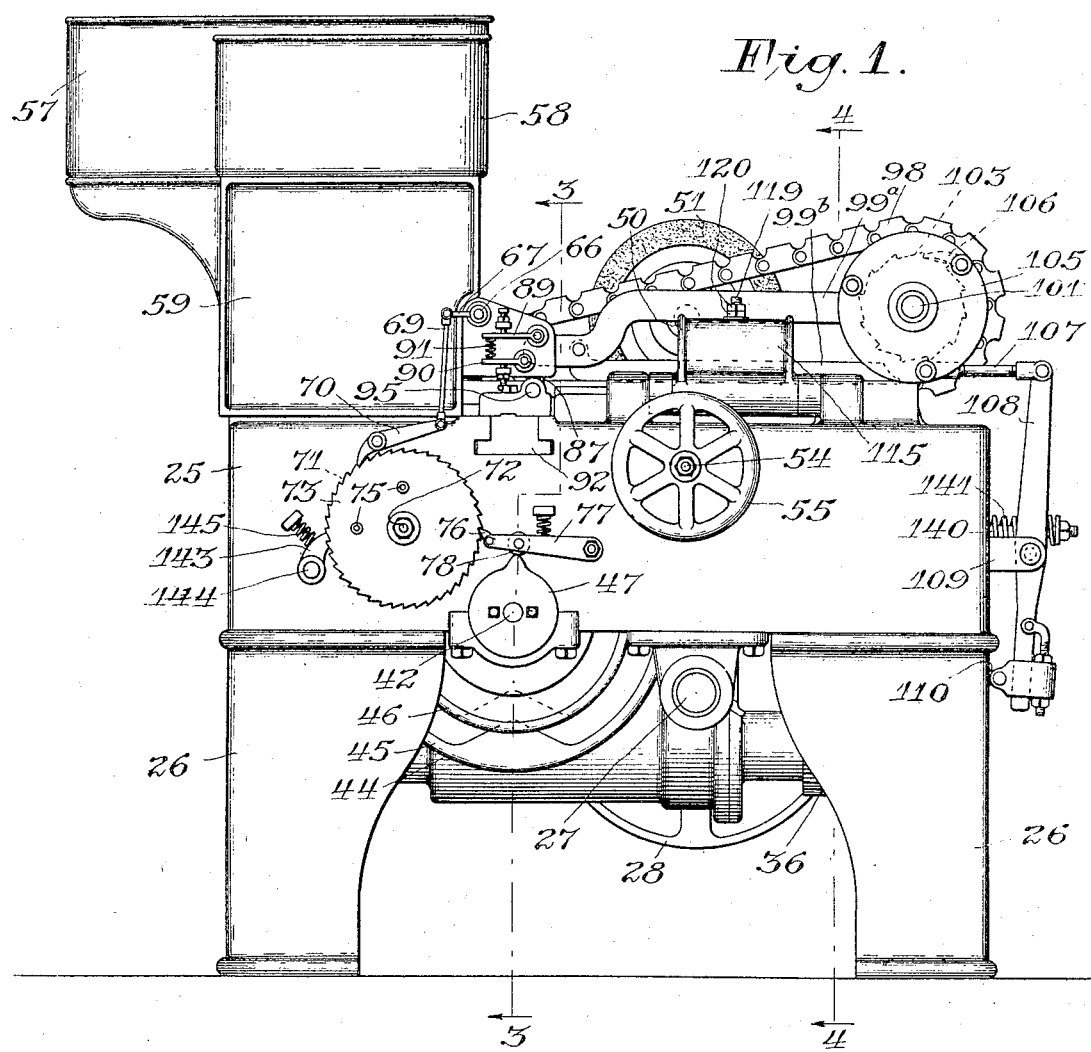
Fig. 1 is a side elevation of a chain assembling and riveting machine embodying my invention.

My chain assembling and riveting machine comprises a main frame 25 supported on legs or standards 26 and having journaled thereon a main drive shaft 27 carrying belt pulleys 28—29 at its outer end from which it is driven. The shaft has keyed thereon a grooved pulley or sheave 30 driving a corresponding sheave 31 through the belt 31', the sheave 31 being splined to the rivet spindle or hammer 32 for a purpose presently to be described. The shaft 27 carries a spiral gear 33 (Figure 7) which meshes with a spiral gear 34 (Figure 6) keyed to the jack shaft 35 mounted in bearings supported by the main frame. The jack shaft carries a gear 36 at one end which meshes with a gear 37 on spindle driving shaft 38. The shaft 38 carries a cam 39 for actuating the rivet spindle as will be described later. The opposite end of the jack shaft has mounted thereon a worm 40, driving a worm wheel 41 (Fig. 3) keyed to the cam shaft 42 supported in bearings on the main frame.

Referring to Figures 3 and 7, the cam shaft has keyed thereon the rivet spindle cut out cam 43, the rivet driving cam 44, the link and rivet feed cam 45, the clamping and chain feed cam 46 and the index cam 47, the functions of which will presently be described.

Slidably mounted on the top of the main frame is an emery wheel standard 48 provided with bearings 49 in which is journaled the shaft 50 carrying an annular emery wheel 51 (Figs. 2 and 6). The main frame is provided with a slot 52 through which projects a depending lug or ear 53 rigidly secured at its upper end to the standard and tapped at its lower end to receive the screw-threaded end of the take-up rod 54. The take-up rod is journaled in the front side of the frame and its projecting end has mounted thereon a hand wheel 55, rotation of which will adjust the emery wheel standard on the frame by reason of the screw-threaded engagement of the take-up rod with the lug 53. The shaft 50 is provided intermediate its ends with a belt pulley 56 by means of which the emery wheel is continuously driven.

Mounted on one end of the main frame are link and pin hoppers 57 and 58 carried on supports 59. Referring now to Figures 5 and 8, the link hopper 57 has leading therefrom to the main frame a link chute or slide 60 through which links are fed to the machine. Slidably mounted beneath the link chute is a link pusher 61 adjustably secured to the pusher slide 62 which is slidably mounted on the main frame. When the link pusher 61 is in forward position as shown in Fig. 5, the link chute is closed, while when the pusher is in retracted position, as shown in Figure 8, the lower end of the chute is uncovered and a link falls on to the forward end of the slide in position to be pushed forward and assembled in the chain being formed, as shown in Figure 15. The pusher slide 62 also carries the pin pusher 63 which is adjustably secured thereto.

Referring now to Fig. 10, a pin chute or slide 64 feeds the pins from the hopper 58 to the pin pusher. Feed of the pins from the chute to the pusher is controlled by the finger 65 carried by the rock shaft 66 (Fig. 1) to the outer end of which is secured one end of the lever 67, the other end of which is connected to a link 69 connected to the rivet spacer arm 70 which is actuated by the rivet separator cam 71 (Fig. 17). The rivet separator cam 71 is rotatably mounted on the stub shaft 72 mounted in the side of the main frame (Figure 7). Rotatably mounted on the same shaft are the ratchet 73 and rivet spindle index cam 74, the ratchet and the two cams being secured to rotate together by pins or bolts 75, as best shown in Figures 16, 17 and 18. The ratchet 73 has formed thereon forty teeth and is actuated step by step by the pawl 76 on the index lever 77 which is pivoted at one end to the main frame and carries a roller 78 intermediate its ends engaging the index cam 47 mounted on the end of the cam shaft 42. On each rotation of the cam shaft 42 the index cam 73 will be advanced one tooth and will carry with it the cams 71 and 74. The rivet separator cam 71 has thirty-nine teeth formed on its periphery of the same pitch as the teeth on the ratchet 73, a space 79 (Fig. 17) being provided between two teeth so that the spacer arm 70 will be inactive when it engages therein.

Returning to Figure 10, each time the cam 71 is advanced one tooth the finger 65 will be actuated to drop a pin in the path of the pusher 63 which will be in retracted position at that time, as shown by dotted lines. At the same time that the pin pusher is retracted, the link pusher will also be retracted and a link will drop into the position shown in Fig. 8, since both the link and pin pushers are carried by the slide 62. The slide will then be moved forward, carrying the pin and link with it into the position shown in Figure 15 where the closed end of the link will enter the open end of the preceding link ready to receive the pin and form a link in the chain.

Referring next to Fig. 5, the pusher slide has a depending lug 80 to which one end of a short link 81 is pivotally connected, the other end of the link being connected to a rocker arm 82, the lower end of which is keyed to one end of a rock shaft 83, having a bearing in a bracket 83′, secured to the main frame 25. The other end of the shaft 83 carries a rocker arm 85 (Fig. 3) having a roller 86 at its lower end which engages in a groove in the cam 45. The groove in the cam 45 is concentric with the axis of rotation throughout substantially its entire length, except for the rise and fall 84, which, when engaged by the roller on the rocker arm actuates the pusher slide, as will be evident from an inspection of Fig. 5.

Referring to Figures 10 and 14, it will be noted that the pin pusher is somewhat higher than the link pusher and that when the pin is pushed in advance of the pusher 63 it falls between the spring pressed retaining fingers 87 and 88 where it is yieldingly held in position ready to be inserted in the holes of two adjacent links as soon as they are in alignment.

Turning to Fig. 1, the finger 87 carries a lever 89 on its outer end, while the finger 88 carries a lever 90. The levers are pressed apart by a spring 91, adjusting means being provided, as clearly shown in the figure, for adjusting the tension of the spring and varying the distance between the lower ends of the fingers 87 and 88.

Referring to Figures 3, 6 and 15, the slide 92 mounted to move transversely of the main frame carries on its lower side a roller 93 engaging in the groove in cam 44. This slide has mounted in alignment thereon a broach 94 and a rivet driver 95, the distance between the ends of which is a little greater than the length of a chain rivet or pin, as clearly shown in Figures 3 and 15. When the pin and link pushers are advanced to feed a pin and link, the slide 92 will occupy its extreme position to the right, as shown by dotted lines in Figure 15, at which time the pin driver 95 will lie between the fingers 87 and 88 so that the pin will drop on top of the driver. During this interval the roller 93 engages in the dwell on the cam 44, but as soon as the link has been fed into position the roller engages the rise 96 on the cam which advances the slide to the left so that the broach 94 enters the holes in the links and accurately aligns them, as shown in Fig. 15. This same movement retracts the driver 95 so that the pin will drop to the lower ends of the fingers 87, 88 (Fig. 10), where it will be directly in front of the end of the driver (Fig. 15). The roller 93 now enters the portion 97 of the cam 44 so that the slide is moved to the right. As the broach is retracted from the links the pin will be fed into the registering holes, as shown in Fig. 3.

As soon as the links and pins are assembled they are engaged by the chain feed mechanism and carried forward to be successively operated upon by the emery wheel 51 and the rivet spindle 32, as will now be described.

Referring to Figures 1, 2 and 5, the chain feeding mechanism comprises a feed chain 98 carried by sprockets 99 and 100, the links of the chain 98 being formed to engage the barrels or cylindrical portions of the links to carry them forward. The drive sprocket 100 is keyed to one end of the short shaft 101 journaled in bearings in brackets 102 mounted on the main frame. A pair of supporting arms 99$^a$ is pivoted at one end to the shaft 101 on opposite sides of the sprocket 100 and at their free ends carry the sprocket 99 and a clamping bar 99$^b$. The clamping bar is free at its opposite end adjacent sprocket 100 and bears throughout its length on the feed chain 98. By means of this construction the feed chain sprocket 99, arms 99$^a$ and bar 99$^b$ have a limited pivoted movement about the shaft 101. The other end of the shaft 101 has keyed thereto a ratchet 103 (Fig. 2) on each side of which is rotatably mounted a plate or pawl carrier 104, 105. These plates have loosely secured between them a pawl 106 (Fig. 1) which is adapted to engage and actuate ratchet 103. The plates or pawl carriers are oscillated on the shaft 101 by a connecting rod 107, one end of which is pivotally connected between the plates and the other end of which is pivotally connected to the upper end of the rocker arm 108 which is fulcrumed intermediate its ends to a bracket 109 on the main frame. The lower end of the rocker arm is adjustably engaged by one end of the link 110, the other end of which engages one arm of the feed chain cam lever or bell crank 111. The bell crank is pivoted to a bracket 112 on the main frame and its other arm carries a roller 113 engaging a cam groove in the double cam 46. Upon each rotation of the cam 46 the bell crank lever 111 will be actuated once, which through the mechanism just described will advance the ratchet 103 one tooth and the feed chain the length of one link. It will thus be apparent that the chain being formed is advanced step by step past the emery wheel and rivet spindle and that the heads of the rivets are kept in contact with the anvil 114. (See Figures 2 and 4.)

Referring now to Figures 1 and 4, 115 indicates a clamping arm pivotally connected at one end to the main frame and adapted at its other end to engage the clamping bar 99ᵇ and clamp the links and pin firmly against the anvil when the pin is in position to be riveted by the rivet spindle. This clamp is actuated by the cam groove 116 in the cam 46.

Turning to Figures 4, 5 and 7, lever 117 is pivoted intermediate its ends to the bracket 112 on the under side of the main frame and carries at one end a roller 118 engaging in the cam groove and at its other end is pivotally connected to a link 119 which extends upwardly through the main frame and through the clamping arm 115 and carries a nut 120 at its upper end adapted to engage the clamping arm. When the pin in the chain being formed is in position to be riveted by the rivet spindle 32 the roller 118 enters the larger concentric portion of the cam groove 116 which operates to raise the left hand end of the lever 117 (Fig. 5) and depress the right hand end which pulls down the clamping arm securely on to the clamping bar 99ᵇ.

Reference will now be had to Figures 4 and 6 for a description of the means for operating the rivet spindle. The spindle 32 is slidably mounted in a bearing 121 at its forward end and at its other end is splined to the rotatable bushing 122 to which the sheave 31 is secured. The forward end of the rivet spindle carries a riveting tool 123 adapted to head the pins in the chain being formed and intermediate its ends the spindle has rotatably mounted thereon a sleeve 124 which is engaged by the forked upper end of the rocker arm 125 mounted on the shaft 126. The lower end of the rocker arm on one side has a toe 127 engaged by one end of a U-shaped spring 128, the other end of which is secured by rivets or bolts 129 to a part of the frame. The lower end of the rocker arm has on its other side a heel 130 adapted to be engaged by the cam 39. From the above description and an inspection of Fig. 4 it will be apparent that as the shaft 38 is rotated, the cam 39 will four times during each rotation force the heel 130 toward the left and move the rivet spindle to retracted position, as shown in Fig. 4, and that as the heel rides over the rises on the cam the spring 128 will force the toe 127 to the right and drive the rivet spindle and tool 123 against the rivet to form a head thereon. Since the cam 39 is rotated through the gears 37, 36, 34, 33, much more rapidly than the cam shaft 42 is driven by the worm gearing, it will be evident that the riveting tool will strike a considerable number of blows upon the rivet while the chain is being held by the clamp 115.

Returning now to the rivet or pin feeding means, when the rivet spacer arm 70 (Fig. 17) engages in the space 79 on the rivet separator cam 71, the finger 65 will not be raised and a pin will not be fed although a link will be fed at this time. Since there are forty teeth on the index 73 and forty teeth less one on the cam 71, every fortieth pin will be omitted and chains having forty links will be formed by the machine. Since every fortieth pin is omitted it becomes advisable to provide means for rendering the rivet spindle inactive whenever the links without pins are clamped in operative position before the rivet spindle, and it is also necessary that the rivet spindle be held inactive during the interval that the feed chain is being operated to advance the chain one step. The rivet spindle cut-out cam and its associated mechanism shown in Figure 19 have been provided to hold the rivet spindle inoperative at each step in the operation of the feed chain and the rivet spindle index cam and its associated mechanism shown in Figures 18 and 19 and have been provided for holding the spindle inoperative at each fortieth interval when there is no pin to be riveted.

Referring to Figures 4, 6, 7 and 19, the rivet spindle is held inoperative by the hammer stop 131, which is pivoted at its lower end to a bracket 132 secured to the lower side of the main frame. This stop is adapted to be swung about its pivotal support into and out of the path of the rocking lever 125 and when it is in the path of the lever, as shown in Figures 4, 6 and 7, the rocker arm and the spindle associated therewith are held inoperative, but when the stop is swung to the full line position shown in Figure 19 it clears the path of the rocker arm and the spindle is free to be reciprocated. Movement of the hammer stop 131 is controlled by the joint action of the spindle cut-out cam 43 and the spindle index cam 74. The cam 43, which is mounted on the main cam shaft 42, has a dwell or concentric portion 133, which extends over a little less than three-fourths of the circumference of the cam, and a rise 134 which embraces about one-fourth of the circumference of the cam. A cam roller lever 135 is pivoted at one end to a bracket 136 on the main frame and at its lower end carries a roller 137 which normally engages the periphery of the cam 43. A connecting rod 138 is pivotally connected at one end of the lever 135 intermediate its ends and at the other end is pivotally connected to the hammer stop 131, the connecting rod being provided intermediate its end with a turn buckle 139 by means of which the position of the hammer stop may be accurately adjusted. A link or rod 140 is pivoted at one end to the hammer stop and extends through an opening in the side of the main frame where its free end engages a coil spring 141 by means of which the roller 137 is normally maintained in engagement with the periphery of the cam 43.

Referring now particularly to Figures 6 and 19, it will be apparent that when the roller 137 is riding over the dwell 133 of the cam the spring 141 will hold the hammer stop to the right, as shown in full lines, so that the rocker arm 125 is free to operate, but when the roller 137 is riding over the rise 134 of the cam the stop will be pulled to the left against the tension of the spring 141 and into the path of the rocker arm. This happens once with each revolution of the cam 43 which is timed with respect to the other cams on the shaft so that the rivet spindle will be held inoperative while the cams 44, 45 and 46 are functioning. When the links from which the pins have been omitted are clamped in position opposite the rivet spindle, the roller 137 will be held out of engagement with the dwell 133 of the cam 43 during one complete revolution of the latter, so that the hammer remains inoperative during this entire interval.

Referring now to Figures 18 and 19, the rivet spindle index cam 74 is provided with a notch 142 which is adapted to be engaged once during each revolution by the pawl 143. This pawl is keyed to a rock shaft 144 and is pressed against the periphery of the cam 74 by means of the spring 145.

Referring now to Figure 7, the shaft 144 is journaled at one end in a bearing in the main frame and at its opposite end in a bearing in the bracket 136. A pawl 146 keyed to the inner end of the shaft 144 is adapted to engage a notch near the end of the connecting rod 138 and hold the roller 137 out of engagement with the cam surface 133, as clearly shown in Figures 6 and 19. When the pawl 143 is depressed into the notch 142 on the cam 74, the shaft 144 will be rocked, and the pawl 146 will drop into engagement with the notch in the connecting rod 138, the cam 43 being so timed that the roller 137 will at that time be riding over the rise 134 and the hammer stop 131 will be in the path of the rocker arm 125. As the cam 43 continues to rotate, the pawl 146 will hold the connecting rod 138 in retracted position during one complete revolution of the cam 43 or until the index cam 74 is again actuated through the ratchet 73 and the cam 47.

While I have described the index 73 as being provided with forty teeth and the rivet cut-out cam 71 as being provided with forty teeth with one tooth cut away, it is to be understood that cams with this number of teeth are used in this case merely to illustrate the invention, and are to be used only when chains having forty links are to be formed. If it is desired to form chains having a different number of links, the index 73 and the rivet cut-out cam 71 will be replaced by cams having a number of teeth to correspond with the desired number of links in the chain, while if it is desired to form a continuous chain the cam 71 will not have a tooth cut away, but will actuate the index-lever 70 at each step. Also when a continuous chain is to be formed the cam 74 will be replaced by a disk having a smooth periphery so that there will be no notch in which the pawl 143 can drop.

Referring again to Figures 9, 11 and 15, the links which I use in forming the chain are U-shaped and are provided at one end with a barrel portion 147 which has a bore that rotatably fits the case hardened pins or rivets, the sides 148 of the link having openings which are a drive fit for the pins whereby the pins will be rigidly held in the sides of the links and the barrel portion will be free to turn on the pins. The small ends of the case hardening pins are chamfered at 149, as shown in Figures 11 and 15 so that they will easily enter the openings in the sides of the links.

When the links and pins are assembled as shown in Figures 8, 10 and 15, the barrels of the links will be engaged by the feed chain 98 and carried forward with the heads of the pins in contact with the anvil 114 past the emery wheel 51 where the ends of the pins will be ground to remove the case and expose the soft interior and also to make the pins of uniform length. After passing the grinding wheel the chain is moved forward step by step, the pins coming successively into operative relation to the rivet spindle which is actuated by the cam to head the rivets and secure the links together.

While I have shown my invention embodied in a machine adapted to assemble links and pins of a particular type, it is to be understood that my invention is not limited thereto, but may be embodied in a machine adapted to form a chain from links and pins of many different types.

Having thus described my invention, what I claim as new and desire to secure by Letters Patent is:

1. In a chain riveting machine, the combination of an abrasive element, a heading tool, means for assembling links and case hardened pins, and conveying mechanism for moving the pins successively past the abrasive element and heading tool whereby one end of the pins will first have the case removed and then be headed.

2. In a chain riveting machine, the combination of an abrasive element, a heading tool, means for assembling links and case hardened pins, and conveying mechanism for moving the pins successively past the abrasive element and heading tool whereby one end of the pins will first have the case removed and then be headed, and means for clamping the chain in position for the pins to be headed.

3. In a chain riveting machine, the combination of a frame, an abrasive element mounted thereon, a riveting tool mounted on the frame, means for assembling links and case hardened pins, a conveyor mounted on the frame to carry the links and pins successively past the abrasive element and riveting tool, whereby the pins will first be ground on one end and then riveted.

4. In a chain riveting machine, the combination of a frame, an abrasive element mounted thereon, a riveting tool mounted on the frame, means for assembling links and case hardened pins, a conveyor mounted on the frame to carry the links and pins successively past the abrasive element and riveting tool, whereby the pins will first be ground on one end and then riveted, and means for continuously driving the abrasive element and intermittently operating the conveyor and riveting tool.

5. In a chain riveting machine, the combination of a frame; a conveyor mounted thereon; mechanism for feeding perforated links and pins comprising means for intermittently feeding links to the conveyor, means for aligning the perforations of adjacent links, means for intermittently feeding pins to an inserting means, means for inserting the pins in the aligned perforations, and means for rendering the pin feeding mechanism inoperative at predetermined intervals; a heading tool mounted on the frame adjacent the conveyor; and means for clamping the links and inserted pins in operative relation to the heading tool, whereby chains of predetermined length will be formed.

6. In a chain riveting machine, the combination of a frame; a conveyor mounted thereon; mechanism for feeding perforated links and pins comprising means for intermittently feeding links to the conveyor, means for aligning the perforations of adjacent links, means for intermittently feeding pins to an inserting means, means for inserting the pins in the aligned perforations, and means for rendering the pin feeding mechanism inoperative at predetermined intervals; a heading tool mounted on the frame adjacent the conveyor; means for clamping the links and inserting pins in operative relation to the heading tool; and means for rendering the heading tool inoperative at predetermined intervals, whereby chains of predetermined length will be formed.

7. In a chain riveting machine, the combination of a frame, a riveting tool mounted on one end of the frame, pin and link feeding mechanism on the other end of the frame, a conveyor adapted to receive pins and links from the feeding mechanism and convey them to the riveting tool, means for feeding links and pins to the conveyor, and means for aligning each link with the next preceding link and inserting a pin in the aligned links.

8. In a chain riveting machine, the combination of a frame, link and pin feeding mechanism and a riveting tool at opposite ends of the frame, a conveyor adapted to receive pins and links from the feeding mechanism and convey them to the riveting tool, said feeding mechanism comprising cam operated means for simultaneously feeding a link and pin to the conveyor, cam operated means for aligning two links and inserting a pin therein, and cam operated means for omitting a pin at predetermined intervals.

9. In a chain riveting machine, the combination of means for assembling links and case hardened pins, an abrasive element, a riveting tool, conveying mechanism receiving the assembled links and pins and feeding the pins successively into position to be operated upon by the abrasive element and riveting tool, and means for relatively adjusting the abrasive element and conveying mechanism.

10. In a chain riveting machine, the combination of means for assembling links and case hardened pins, an abrasive element, a riveting tool, conveying mechanism receiving the assembled links and pins and feeding the pins successively into position to be operated upon by the abrasive element and riveting tool, and means for rendering the riveting tool inoperative at predetermined intervals whereby chains of fixed length will be formed.

11. In a chain riveting machine, the combination of means for feeding and assembling links and case hardened pins, an abrasive element, a riveting tool, means rendering the pin feeding means inoperative at fixed intervals, conveying mechanism receiving the assembled links and pins and feeding the pins successively into position to be operated upon by the abrasive element and riveting tool, and means for relatively adjusting the abrasive element and conveying mechanism.

12. In a chain riveting machine, the combination of means for assembling links and case hardened pins, an abrasive element, a riveting tool, means rendering the pin feeding means inoperative at fixed intervals, conveying mechanism receiving the assembled links and pins and feeding the pins successively into position to be operated upon by the abrasive element and riveting tool, means for relatively adjusting the abrasive element and conveying mechanism, and means for rendering the riveting tool inoperative at fixed intervals.

13. In a chain assembling and riveting machine, the combination of a frame, a drive shaft journaled on said frame, a feed chain driven from said shaft, a pusher for feeding links to the feed chain, means mounted on the frame for delivering links to the pusher, means for inserting pins in the links, and means operated from the drive shaft for actuating the pusher and pin inserting means.

14. In a link and pin feeding mechanism, the combination of a frame, a shaft journaled thereon, link and pin supplying means on the frame, means operated from the shaft for delivering links and pins to a chain being formed, and means driven from the shaft for aligning the links and inserting the pins.

15. In a link and pin feeding mechanism, the combination of a frame, a shaft journaled thereon, link and pin supplying means, means intermittently operated from the shaft for receiving a link and pin from the supply means and delivering them to a chain being formed, means for aligning successive links, means for inserting a pin in the aligned links, and common operating means driven from said shaft for actuating said aligning and inserting means.

16. In a link and pin feeding mechanism, the combination of a frame, a shaft journaled thereon, link and pin supplying means, means intermittently operated from the shaft for simultaneously delivering a link and a pin to a chain being formed, means for aligning successive links, means for inserting the pins in the aligned links, and common operating means driven from said shaft for actuating said aligning and inserting means.

17. In a link and pin feeding mechanism, the combination of a frame, a shaft journaled thereon, link and pin supplying means, means operated from the shaft for delivering a link and a pin to a chain being formed, means for rendering the pin-delivering means inoperative at predetermined intervals, and means driven from the shaft for aligning the links and inserting the pins.

18. In a link and pin feeding mechanism, the combination of a frame, a shaft journaled thereon, link and pin supplying means, a pusher adapted to simultaneously receive a link and pin from said supplying means and advance them to a chain being formed, a slide having a broach to align successive links and a driver to insert the pins in the aligned links, and cam means actuated from the shaft for operating the pusher and slide.

19. In a chain riveting machine, the combination of a frame, an anvil thereon, means on the frame for assembling links and headed pins, means for receiving the assembled links and pins and holding the heads of the pins against the anvil, a rivet spindle reciprocatably and rotatably mounted on the frame in position to operate on the rivets when held against said anvil, a rocker arm pivoted to the frame and engaging the spindle at one end, a cam rotatably mounted on the frame and engaging the other end of the rocker arm to retract the arm and spindle, means for rotating the cam, and a spring engaging the rocker arm to return the arm and spindle.

20. In a chain riveting machine, the combination of a frame, rivet supplying means thereon, a pusher, an index finger adapted to intermittently feed a rivet from the supplying means to the pusher, means for aligning the rivets received from the pusher, a cam shaft journaled in the frame, means actuated by the cam shaft for intermittently operating the index finger and pusher, and means for periodically rendering the index finger inoperative.

21. In a chain riveting machine, means for supplying perforated links and pins, means for aligning the perforations of the links and inserting the pins, an anvil, means for feeding the links and pins to the anvil, means for holding one end of the pins successively against the anvil, a rivet spindle adapted to rivet the other end of the pins, and means for intermittently and coordinately actuating the supplying means, aligning means, feeding means, holding means, and spindle.

22. In a chain riveting machine, means for supplying perforated links and pins; means for aligning the perforations of the links and inserting the pins; an anvil, means for feeding the assembled links and pins to the anvil, means for holding one end of the pins successively against the anvil; a rivet spindle adapted to rivet the other end of the pins, means for intermittently and coordinately actuating the supplying means, aligning means, feeding means, holding means and spindle; and means for periodically rendering the rivet spindle inoperative.

23. In a chain riveting machine, means for assembling links and pins, an abrasive element, a riveting tool, an anvil, and means for feeding the assembled links and pins with the pins in contact with the anvil successively into operative relation to the abrasive element and riveting tool whereby one end of the pins will first be ground and then riveted.

24. In a chain riveting machine, means for assembling links and pins, an abrasive element, a riveting tool, an anvil, means for feeding the assembled links and pins with the pins in contact with the anvil successively into operative relation to the abrasive element and riveting tool, whereby one end of the pins will first be ground and then riveted, and means for adjusting the abrasive element relative to the anvil.

25. In a chain riveting machine, means for assembling links and pins, an abrasive element, a riveting tool, an anvil, means for feeding the assembled links and pins with the pins in contact with the anvil successively into operative relation to the abrasive element and riveting tool, means for continuously driving the abrasive element, and means for intermittently operating the riveting tool, whereby one end of the pins will first be ground and then riveted.

26. In the art of manufacturing chains, that process which consists in successively feeding perforated links to a chain being formed, successively aligning the perforations of adjacent links, inserting case-hardened pins in the aligned perforations, removing the case from one end of the pins and forming a head thereon to secure the pins in the links.

27. In the art of manufacturing chains, that process which consists in continuously feeding perforated links to a chain being formed, aligning the perforations of successive links, inserting hardened pins in the aligned perforations, grinding the ends of the pins to expose their soft interiors, and riveting the pins to secure the links together to form a chain.

28. In the art of manufacturing chains, that process which consists in simultaneously feeding links and pins to a chain being formed, aligning each link with the preceding link in the chain, inserting the pins in the aligned links, securing the pins in place, and at predetermined intervals feeding a link only, whereby chains of a predetermined number of links will be formed.

29. In a chain machine, the combination of means for feeding perforated links to a chain being formed, means for aligning the perforations of adjacent links, means for feeding and inserting pins in the aligned perforations to secure the links together, and means for periodically rendering the pin feeding means inoperative whereby chains of a predetermined number of links will be formed.

In testimony whereof I affix my signature.

GUSTAF BARKSTROM.